United States Patent [19]

Sasazawa et al.

[11] 4,179,387

[45] Dec. 18, 1979

[54] PROCESS FOR PRODUCING MAGNETIC FE OXIDE

[75] Inventors: Koji Sasazawa; Mahito Shimizu; Tatsuji Kitamoto, all of Odawara, Japan

[73] Assignee: Fuji Photo Film Co., Ltd., Minami-ashigara, Japan

[21] Appl. No.: 862,884

[22] Filed: Dec. 21, 1977

Related U.S. Application Data

[60] Division of Ser. No. 792,956, May 2, 1977, abandoned, which is a continuation of Ser. No. 557,431, Mar. 11, 1975, abandoned.

[30] Foreign Application Priority Data

Mar. 12, 1974 [JP] Japan .................................. 49-28423

[51] Int. Cl.$^2$ ...................... C04B 35/26; C01G 49/06; C01G 49/08
[52] U.S. Cl. .............................. 252/62.56; 252/62.57; 252/62.59; 252/62.6; 252/62.62; 252/62.63; 252/62.64
[58] Field of Search ............... 252/62.56, 62.57, 62.59, 252/62.6, 62.62, 62.63, 62.64

[56] References Cited

U.S. PATENT DOCUMENTS

| | | | |
|---|---|---|---|
| 2,689,167 | 9/1954 | Dovey et al. | 252/62.56 X |
| 3,720,618 | 3/1973 | Toda et al. | 252/62.56 |
| 3,748,270 | 7/1973 | Hwang | 252/62.56 |

OTHER PUBLICATIONS

Imaoka et al., "Ferrites:Proc. of the International Conf.," Jul. 1970, Japan, pp. 467–470.

*Primary Examiner*—Jack Cooper
*Attorney, Agent, or Firm*—Sughrue, Rothwell, Mion, Zinn and Macpeak

[57] ABSTRACT

A magnetic Fe oxide containing Co, and optionally, a divalent metal, in which the oxidation degree indicated by the following formula ranges from about 30% to 80%;

$$\text{Oxidation Degree} = (1 - \frac{300 - y}{100 - y} \cdot R) \times 100\ (\%)$$

wherein y is the amount of the Co, plus the divalent metal if present, in atomic % contained in the magnetic Fe oxide, and R is the ratio of the divalent Fe ion to the total Fe ions;

and a process for producing a magnetic Fe oxide containing Co, and optionally, a divalent metal, and having an oxidizing degree of about 30 to 80%, which comprises dehydrating and reducing goethite containing Co, and optionally, the divalent metal, to obtain magnetite containing Co, and optionally, a divalent metal, and oxidizing gradually the magnetite at a relatively low temperature of lower than about 100° C.

5 Claims, 1 Drawing Figure

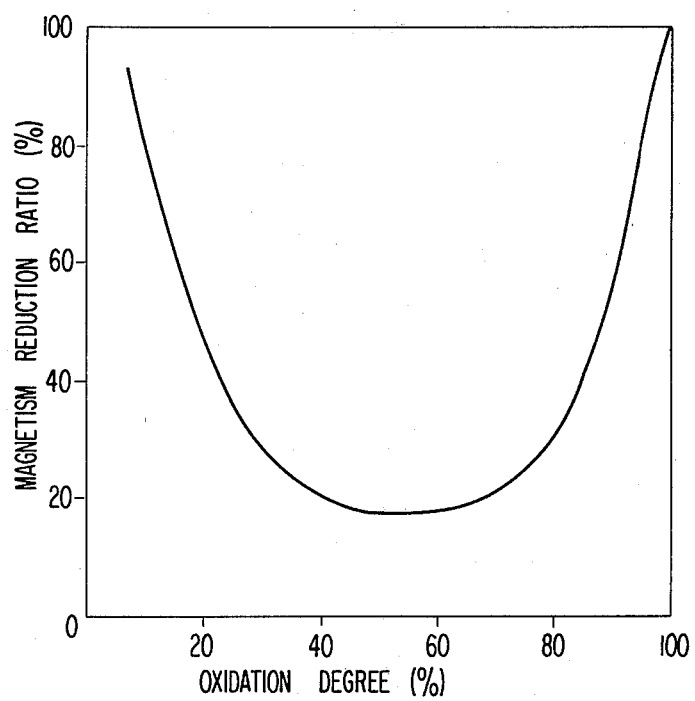

PROCESS FOR PRODUCING MAGNETIC FE OXIDE

The present application is a Divisional Application of U.S. Ser. No. 792,956 filed May 2, 1977 now abandoned which was a Continuation of U.S. Ser. No. 557,431 filed Mar. 11, 1975, now abandoned.

BACKGROUND OF THE INVENTION

1. Field of the Invention

This invention relates to a magnetic Fe oxide powder suitable for producing a magnetic recording member having stable magnetic properties resistant to mechanical pressure and impact, and more particularly to a magnetic Fe oxide powder suitable for producing a magnetic recording member having less coercive force ageing, especially a magnetic Fe oxide powder including Co or like divalent metals (hereinafter designated as Co) and having a high magnetic anisotropy and coercive force.

This invention also relates to a process for producing the magnetic Fe oxide.

2. Description of the Prior Art

A Co containing magnetic Fe oxide powder is already known for producing a magnetic recording member, which is obtained by adding Co to a magnetic Fe oxide. The coercive force of the Co-containing Fe oxide powder is high and the resulting recording member can be used for high density recording. Methods of adding Co to Fe oxide are disclosed, for example, in Japanese Patent Publication Nos. 15638/60, 10994/73, 6538/66 and U.S. Pat. No. 3,573,980.

When a Co containing γ-Fe oxide powder or a Co containing magnetite is formed into a magnetic tape or a like magnetic recording body, the resulting magnetic recording member is magnetically unstable to mechanical pressure and impact. That is to say, the information and signals recorded on the magnetic recording member are weakened by mechanical pressure and impact. Accordingly, where the recorded tape is played repeatedly, the S/N ratio gradually diminishes. Such a undesirable phenomenon is especially marked in a recording member made from a Co containing magnetic Fe oxide, whereas a recording member made from a usual Fe oxide or Cr oxide does not exhibit this phenomenon as markedly. Such phenomenon was already reported in (1) Akashi et al. *Television*, 18, p. 767 (1964), and (2) Kuroe et al. *Magnetic Recording Research Conference Text*, No. MR 72-19 (Sept. 1972).

Studies have been made on improvements in the thermal and mechanical stabilities of Co-containing magnetic Fe oxide. To obtain thermal stability in Co-containing magnetic Fe oxide, metallic ions other than Co ion are added to the oxide. Thus, a Co-containing magnetic Fe oxide exhibiting a low reversible coercive force change in the heated state can be produced (as disclosed, for example, in Japanese Patent Publication No. 12175/68, and Japanese Patent Publication (O.P.I.) Nos. 27298/73, 27299/73). U.S. Pat. No. 3,573,980 discloses a method of producing a Co-containing magnetic Fe oxide exhibiting less magnetization at a high temperature by adding reduced Co to the Fe oxide.

The coercive force ageing and the magnetic stabilities to mechanical pressure and impact have not yet been fully examined. Improvement in these properties of a Co-containing magnetic Fe oxide is an urgent problem to be solved.

SUMMARY OF THE INVENTION

Therefore, an object of this invention is to improve the magnetic stability of a Co-containing magnetic Fe oxide to mechanical pressure and impact and to provide a process for producing a stable Co-containing magnetic Fe oxide.

Another object of this invention is to provide a magnetic Fe oxide exhibiting a low coercive force ageing and a process for producing the same.

It has now been discovered after much research that a Co-containing magnetic Fe oxide becomes extremely stable to mechanical pressure and impact at a suitable oxidation degree during a gradual oxidizing treatment. The term "oxidation degree" is indicated by the following relationship;

$$\text{Oxidation Degree} = (1 - \frac{300 - y}{100 - y} \cdot R) \times 100 \, (\%)$$

wherein y is the amount of the Co, and a divalent metal if present, in atomic % contained in the magnetic Fe oxide, and R is the ratio of the divalent Fe ions to the total Fe ions.

This invention also provides a process for producing the magnetic Fe oxide containing Co, and optionally, a divalent metal, and having an oxidation degree of about 30 to 80% which comprises dehydrating and reducing goethite containing Co, and optionally, a divalent metal, to obtain magnetite containing Co, and optionally, a divalent metal, and gradually oxidizing the magnetite at a relatively low temperature of lower than about 100° C.

BRIEF DESCRIPTION OF THE DRAWING

The FIGURE shows the relation between the oxidizing degree of the magnetic Fe oxide and the magnetism reduction ratio.

DETAILED DESCRIPTION OF THE INVENTION

One feature of this invention is to oxidize gradually Co containing magnetite at a relatively low temperature, e.g., about room temperature (about 20°–30° C.) to 100° C. According to the process described in the U.S. Pat. No. 3,573,980, the coercive force of the magnetic powder is increased by adding a small amount of Co, e.g., 1 to 12% by weight to γ-Fe$_2$O$_3$ and reducing a part of the latter into FeO.

Another feature of this invention is to provide a process for producing a magnetic Fe oxide containing a divalent metal and exhibiting an oxidation degree of about 30 to 80% by dehydrating and reducing goethite containing Co and, if desired a divalent metal, to obtain magnetite containing Co and a divalent metal, if present, and oxidizing gradually the latter at a relatively low temperature range, i.e., below about 100° C.

If the Co content in the Co-containing magnetic Fe oxide according to this invention exceeds about 5 atomic %, the magnetic characteristics are greatly reduced as compared with a conventional Co-containing γ-Fe$_2$O$_3$ or magnetite. If the Co content is not more than about 0.5 atomic %, the effect of Co to increase the coercive force of the resulting magnetic Fe oxide is scarcely observed.

The coercive force of the magnetic Fe oxide of this invention must be higher than about 300 Oe, preferably higher than 1,500 Oe, and such a coercive force can be controlled by changing the Co content. For example, when 1.5 atomic % of Co is added to the Fe oxide at an oxidation degree of 50%, a coercive force of 510 Oe can be obtained; if 2.5 atomic % of Co is added, a coercive force of 640 Oe can be obtained; and if 4.0 atomic % of Co is added, the coercive force becomes 780 Oe. A suitable range for the Co present in the magnetic Fe oxide is about 0.5 to 10 atomic %.

The magnetic Fe oxide powder according to this invention can contain small amounts of Mg, Cu, Cr, Mn, Ni, Zn, Mo, Sn, Sb, Te, Rh, Ba, La, Ce, W and Bi in addition to Co. A suitable amount of these additional elements plus the Co in the magnetic Fe oxide can range from about 0.5 to 33 atomic %.

The resultant Co-containing magnetic Fe oxide powder can be acicular or granular. If acicular, each particle preferably has a longer diameter of about 0.1 $\mu$m to 1 $\mu$m. If granular, the maximum size of each particle is restricted by the increase of the noise when used as a magnetic recording material, and the minimum size is restricted by the reduction in the transfer effect and the increase of the washing and filtering time during powder production.

Acicular Fe oxide can be produced by processes as described in U.S. Pat. Nos. 3,117,933, and 3,720,618 and Japanese Patent Publication No. 6538/66.

Granular Fe oxide can be produced by preparing first an aqueous solution of Fe (II) and Co (II) in the desired amounts, adding sodium hydroxide, potassium hydroxide or ammonium hydroxide to the aqueous solution to keep the pH thereof above about 10 and oxidizing the aqueous solution with air, oxygen, nitrate or like oxidants keeping the temperature of the solution at about 20° to 100° C.

The Fe oxides thus obtained ($Fe_3O_4 \cdot nH_2O$, $\alpha$-FeOOH or $\alpha$-$Fe_2O_3$ obtained by baking the latter, $Fe_3O_4$, $\gamma$-$Fe_2O_3$, each containing the desired amount of Co) are reduced with hydrogen or town gas at about 300° to 400° C., preferably 350° C., to convert the oxides into $Fe_3O_4$, which is cooled room temperature (e.g., about 20°–30° C.) under a flow of $N_2$ gas so that the $Fe_3O_4$ is not contacted with air and then covered with water. For example, the cooled $Fe_3O_4$ is sprayed with water or dipped in a water bath. After removing the excess water, the obtained $Fe_3O_4$ particles contain usually about 50 to 200% by weight of moisture with respect to dried $Fe_3O_4$ particles. An aqueous solution of nitric acid, sodium nitrate, ammonium nitrate or a like oxidant, sodium hydroxide, ammonium hydroxide, chloric acid and sulfuric acid can be used instead of the water. In such cases, the $Fe_3O_4$ particles must be fully washed with water to remove the soluble materials therein.

After that, the wet "Co-containing magnetite" thus prepared is treated in a constant temperature vessel kept at about 40° to 100° C. and under normal atmospheric pressure. If the temperature in the vessel is not higher than about 40° C., the treatment requires one week or longer. On the other hand, if the temperature exceeds about 100° C., the oxidation is undesirably accelerated generating heat, thus a non-uniform product is obtained. The time required for accomplishing the treatment is about 10 min. to 1 week.

The binder used in the process of this invention for binding the Co-containing Fe oxide particles can be a conventional thermoplastic resin, thermosetting resin, or a mixture thereof.

Useful thermoplastic resins have a softening point of lower than about 150° C., a mean molecular weight of about 10,000 to 200,000 and a degree of polymerization of about 200 to 2,000, and include the following polymers; vinyl chloride-vinyl acetate copolymers, vinyl chloride-vinylidene chloride copolymers, vinyl chloride-acrylonitrile copolymers, acrylic ester-vinylidene chloride copolymers, acrylic ester-styrene copolymers, methacrylic ester-acrylonitrile copolymers, methacrylic ester-vinylidene chloride copolymers, methacrylic ester-styrene copolymers, urethane elastomers, polyvinyl fluoride resins, vinylidenechloride-acrylonitrile copolymers, butadiene-acrylonitrile copolymers, polyamide resins, polyvinyl butyral, cellulose derivatives (cellulose acetate butyrate, cellulose diacetate, cellulose triacetate, cellulose propionate, nitrocellulose), styrene-butadiene copolymers, polyester resins, chlorovinyl ether-acrylic ester copolymers, amino resins, various synthetic rubber resins and mixtures thereof.

These thermo plastic binder resins are described in Japanese Patent Publication Nos. 6877/62, 12528/64, 19282/64, 5349/65, 20907/65, 9463/66, 14059/66, 66985/66, 6428/67, 11621/67, 4623/68, 15206/68, 2889/69, 17947/69, 18232/69, 14020/70, 14500/70, 18573/72, 22068/72, 22069/72, 22070/72, and 27886/72, and U.S. Pat. Nos. 3,144,352, 3,419,420, 3,499,789 and 3,713,887.

Useful thermosetting resins have a molecular weight of less than about 200,000 as a coating solution, but the molecular weight becomes infinity due to the condensation and addition reactions occurring on heating the coating solution. Such resins are preferably not softened or melted before they thermally decompose. Examples of thermosetting resins are phenol resins, epoxy resins, polyurethane hardening resins, urea resins, melamine resins, alkyd resins, silicone resins, acrylic reactive resins, epoxypolyamide resins, nitrocellulose-melamine resins, a mixture of high molecular weight polyester resin and an isocyanate prepolymer, a mixture of a metha crylic copolymer and a diisocyanate prepolymer, a mixture of a polyesterpolyol and a polyisocyanate, urea-formaldehyde resins, a mixture of a low molecular weight glycol, a high molecular weight diol and triphenylmethanetriisocyanate, polyamine resins and the mixtures thereof.

These resins are described in Japanese Patent Publication Nos. 8103/64, 9779/65, 7192/66, 8106/66, 14275/66, 18179/67, 12081/68, 28023/69, 14501/70, 24902/70, 13103/71, 22065/72, 22066/72, 22067/72, 22072/72, 22073/72, 28045/72, 28048/72 and 28922/72, and U.S. Pat. Nos. 3,144,353, 3,320,090, 3,437,510, 3,597,273, 3,781,210, and 3,781,211.

The binder can be used individually or as mixtures. Other ingredients, such as dispensing agents, lubricants, abrasive agents and anti-static agents, can be added to the binder. The weight ratio of the ferromagnetic powder to the binder can suitably range from about 100:10 to 100:200.

Useful dispensing agents are caprylic acid, capric acid, lauric acid, myristic acid, palmitic acid, stearic acid, oleic acid, elaidic acid, linoleic acid, linolenic acid, stearolic acid or like fatty acids represented by the formula $R_1COOH$ (where $R_1$ is an alkyl or alkenyl group having 11 to 17 carbon atoms), alkali metal (Li, Na, K, etc.) or alkaline earth metal (Mg, Cs, Ba, etc.) salts of these fatty acids, and lecithin. Higher alcohols having more than 12 carbon atoms and the sulfuric esters thereof can be used.

Such a dispersing agent is employed in the binder in a weight ratio of the dispersing agent to the binder of about 10:100 to 20:100. Suitable dispersing agents are described in Japanese Patent Nos. 28369,64, 17945/69 and 15001/73, and U.S. Pat. Nos. 3,387,993 and 3,470,021.

Useful lubricants are silicone oils, graphite, molybdenium disulfide, tungsten disulfide, fatty acid esters of monocarboxylic fatty acids having 12 to 16 carbon atoms and monohydric alcohols having 3 to 12 carbon atoms, and fatty acid esters of monocarboxylic fatty acids having more than 17 carbon atoms and monohydric alcohols in which the total number of carbon atoms in the ester is 15 to 28. 0.2 to 2.0 weight parts of such a lubricant are generally employed per 100 parts of the binder. These lubricants are described in Japanese Patent Publication Nos. 23889/68, and 28043/72, Japanese Patent Application Nos. 28647/67 and 81543/68, and U.S. Pat. No. 3,423,233.

The useful abrasives are fused alumina, silicon carbide, chromium oxide, corundum, synthetic corundum, diamond, synthetic diamond, garnet and emery (main components are corundum and magnetite). A suitable abrasive has a mean particle size of about 0.05 to 2 $\mu$m, preferably 0.1 to 2 $\mu$m. Generally about 7 to 20 weight parts of the abrasive particles are employed per 100 weight parts of the binder. These abrasives are described in Japanese Patent Application No. 26749/73.

The useful anti-static agents are saponin or like natural surfactants, alkyleneoxides, glycerin, glycidol or like nonionic surfactants, higher alkylamines, quaternary ammonium salts, pyridine or like heterocyclic compounds, phosphonium, sulfonium or like cationic surfactants, carboxylic acids, sulfonic acids, phosphoric acids, anionic surfactants containing sulfuric acid ester groups, phosphoric acid ester groups or like acidic groups, aminoacids, aminosulfonic acids, sulfuric or phosphoric esters of aminoalcohols or like ampholytic surfactants.

Some of these surfactant compounds used as the antistatic agents are described in U.S. Pat. Nos. 2,271,623, 2,240,472, 2,288,226, 2,676,122, 2,676,924, 2,676,975, 2,691,566, 2,727,860, 2,730,498, 2,742,379, 2,739,891, 3,068,101, 3,158,484, 3,201,253, 3,210,191, 3,294,540, 3,415,649, 3,441,413, 3,442,654, 3,475,174 and 3,545,974, German Patent Publication (OLS) 1,942,665, British Patent Nos. 1,007,317 and 1,198,450, R. Oda et al. *Synthesis of the Surface Active Agents and Their Applications,* Maki Shoten (1964), A. W. Perry, *Surface Active Agents,* Interscience Publications Inc. (1958), T. P. Sisley *Encyclopedia of Surface Active Agents,* Vol. 2.2, Chemical Publishing Co., (1964), and *Surface Active Agent Handbook* 6th, Edition, Sangyo Tosho K. K., (Dec. 20, 1966).

These surface active agents can be used individually or as mixtures. The surfactant is used not only for inhibiting the formation of stactic electricity but also for improving the dispersing, lubricating and coating properties and the magnetic properties of the resulting recording member.

The formation of the magnetic recording layer can be carried out by dispersing the Fe oxide mixture in the organic solvent and applying the resulting composition on a support. A suitable coating thickness of the magnetic layer on the support ranges from about 0.5 to 20 $\mu$m, preferably 2 to 15 $\mu$m.

The non-magnetic support can have a thickness of about 2.5 to 100 $\mu$m, preferably 3 to 40 $\mu$m, for a tape, and suitable supports are polyethylene terephthalate, polyethylene naphthalate or like polyesters, polypropyrene or like polyolefins, cellulose triacetate, cellulose diacetate or the like cellulose derivatives, polyvinyl chloride or like vinyl resins, polycarbonate or like synthetic resins, aluminum, copper or other metals, glass or ceramics, etc.

Useful organic solvents for kneading the Fe oxide particles and coating the resulting composition are acetone, methyl ethyl ketone, methyl isobutyl ketone, cyclohexanone or like ketones, methanol, ethanol, propanol, butanol or like alcohols, methyl acetate, ethyl acetate, butyl acetate, ethyl lactate, glycol acetate monoethyl ether, or like esters, diethyl ether, glycol dimethyl ether, glycol monoethyl ether, dioxane or like ethers, benzene, toluene, xylene, or like aromatic hydrocarbons methylene chloride, ethylene chloride, carbon tetrachloride, chloroform, ethylene chlorohydrin, dichlorobenzene or like chlorinated hydrocarbons, etc.

For coating the Fe oxide containing mixture on a support, an air doctor coating method, a blade coating method, an air knife coating method, a squeeze coating method, a dip coating method, a reverse roll coating method, a transfer roll coating method, a kiss coating method, a cast coating method, and a spray coating method can be used. The details of these coating methods are described in *Coating Engineering,* pp 253-277, Asakura Shoten (Mar. 20, 1971).

The magnetic Fe oxide used in the FIGURE is a Co-containing Fe oxide which contains about 4 atomic % Co and is mildly oxidized at 60° C. The "magnetism reduction ratio" means the ratio of the magnetism reduction amount in a magnetic tape made from a magnetic Fe oxide with a 100% oxidation degree to that in a magnetic tape made from a magnetic Fe oxide of any oxidation degree. The magnetism reduction amount is indicated by the ratio of the difference between the regenerated output (A) after running the tape for a predetermined time period compressed with a roller with a constant controlled pressure and that (B) immediately after recording the latter (B). (A−B/B).

From the test results a Fe oxide containing more than 0.5 atomic % Co exhibits a similar behavior to that of the Fe oxide shown in the FIGURE. That is to say the magnetism reduction amount of the Fe oxide is decreased in the range of an oxidation degree of about 30 to 80%.

The Co-contaning magnetic Fe oxide according to this invention exhibits an extremely low magnetism and is capable of recording and retaining stably information and signals as compared with a conventional Co-containing Fe oxide and magnetite.

Now, this invention will be described with reference to the following examples. Unless otherwise indicated, all parts, percents, ratios and the like are by weight.

EXAMPLE 1

Ferrous sulfate (200 g) was dissolved in water (600 ml), and the resultant solution was added to a solution prepared by disolving sodium hydroxide (28.8 g) in water (1800 ml). Air was bubbled into the solution mixture at room temperature to accelerate the reaction therein until the solution was colored yellow, and then the precipitate was filtered and again dispersed in water (2 liters). The crystal nuclei had a diameter of 0.05 $\mu$m and a length of 0.5 $\mu$m, and the dispersed solution contained goethite (24 g). After keeping the solution temperature at 50° C., 2 liters of a 0.5 mol% ferrous sulfide aqueous solution containing Co sulfide (5.2 mol%) was added to the dispersed solution at a constant rate over about 8 hours while controlling the pH of the resulting solution at 6.0 by adding a 2 N sodium hydroxide aqueous solution thereto. Thus, each of the crystal nuclei grew to have a diameter of 0.2 μm and a length of 1.1 μm.

The Co content of the goethite was found to be 4.0% by fluorescent X-ray analysis. The obtained Co containing goethite was converted into Co-containing $\alpha$-$Fe_2O_3$ by exposing the goethite to an air flow at 300° C. The Co-containing $\alpha$-$Fe_2O_3$ was reduced in a hydrogen gas flow at 350° C., cooled to room temperature, and removed exposed to air, while mildly oxidizing the surface layer with a low oxygen partial pressure to not cause a violent oxidation. The oxidation degree was about 5%.

The obtained Co containing magnetite was placed in a drier kept at 60° C. to oxidize under mild conditions for about 40 hours. Thus, a magnetic Fe oxide having a coercive force of 720 Oe and a oxidation degree of 25% was obtained. (Magnetic Material A)

EXAMPLE 2

A Co containing goethite obtained in the same manner as in Example 1 was exposed to an air flow at 300° C. to convert it into a Co-contaning $\alpha$-$Fe_2O_3$, which was then reduced in a hydrogen gas flow at 350° C. and then cooled. The obtained $Fe_3O_4$ was dipped in water without exposure to air, dried in a drier at 60° C. for 40 hours, and oxidized under mild conditions. Thus, a magnetic Fe oxide having the coercive force of 780 Oe and an oxidation degree of 45% was obtained (Magnetic Material B).

EXAMPLE 3

A Co containing magnetite (60 g), which was produced in the same manner as in Example 1, was dispersed in 300 ml water, and ammonium nitrate (30 g) was added to the dispersion. While a sodium hydroxide aqueous solution was added to the resulting solution to keep the pH at 9, the solution was agitated for 1 hour and then washed with water. After drying for 24 hours at 60° C., a Co containing magnetic Fe oxide having a coercive force of 750 Oe and an oxidation degree of 35% was obtained (Magnetic Material C).

EXAMPLE 4

A Co containing magnetite obtained in the same manner as in Example 1 was dipped in chloric acid (0.1 N aqueous solution) for 30 min., and then washed with water. The resulting magnetite was dried and oxidized under mild conditions in a drier for 40 hours at 60° C. The obtained Co containing magnetic Fe oxide (Magnetic Material D) had a coercive force of 780 Oe and an oxidation degree of 55%.

EXAMPLE 5

A Co containing magnetite obtained in the same manner as in Example 1 was dried and oxidized gradually at 60° C. for 140 hours in a drier. Thus, a Co containing magnetic Fe oxide produced (Magnetic Material E) had a coercive force of 640 Oe and an oxidation degree of 85%.

COMPARATIVE EXAMPLE 1

A magnetite which contained Co (4%) was cooled and dipped in a solvent without exposure to atmospheric air (Magnetic Material F). The oxidation degree was 0%.

COMPARATIVE EXAMPLE 2

A magnetite was oxidized in atmospheric air at 250° C. and $\gamma$-$Fe_2O_3$ containing Co (4%) was obtained (Magnetic Material G). The oxidation degree was 100%.

EXAMPLE 6

Each of the Co containing magnetic Fe oxide Magnetic Materials A to G (300 g) was mixed with the following composition

|  | parts by weight |
|---|---|
| Vinyl Chloride-Vinyl Acetate (87:13 by weight) Copolymer | 40 |
| Epoxy Resin* | 30 |
| Silicone Oil** | 5 |
| Toluene Sulfonethylamide | 7 |
| Ethyl Acetate | 250 |
| Methyl Ethyl Ketone | 250 |

*epichlorohydrin and diphenyl propane condensate having a hydroxyl group content of 0.29, a molecular weight of about 470; an epoxy content of 0.40; an epoxy equivalent of 250
**dimethyl polysiloxane having a molecular weight of about 1,000, a specific gravity of (25° C.) of 0.94 and a viscosity (25° C.) of 98 Centistokes The obtained composition was well kneaded in a ball mill and "Desmour L-75" (trade name, produced by Bayer A. G.; 75 wt.% ethyl acetate solution containing an adduct of 3 moles of toluenediisocyanate and 1 mole of trimethylol propane) (20 parts) was dispersed uniformly in the composition to obtain a magnetic coating composition. Each of the magnetic coating compositions was applied on an ethylene terephthalate support of a thickness of 25 μm so as to form thereon a dried magnetic layer of a thickness of 10 μm, and produce Tape Samples A to G corresponding to Magnetic Materials A to G. Each of the obtained tapes was placed in a 1,000 Oe magnetic field and dried to produce a magnetic tape.

Each of the resultant magnetic tapes were examined using a magnetism reducing tester to measure the reduced magnetic amount after running 300 times. The test results obtained are shown in the following Table.

| Tape Sample | Oxidation Degree (%) | Coercive Force* (Oe) | Saturation Squareness Ratio* | Magnetic Magnetism* (Gauss) | Reduced Amount (%) |
|---|---|---|---|---|---|
| A | 25 | 720 | 0.78 | 1360 | 17 |
| B | 45 | 780 | 0.79 | 1400 | 10 |
| C | 35 | 750 | 0.75 | 1350 | 13 |
| D | 55 | 780 | 0.82 | 1280 | 7 |
| E | 85 | 640 | 0.80 | 1310 | 18 |
| F | 0 | 540 | 0.75 | 1420 | 30 |
| G | 100 | 520 | 0.81 | 1230 | 35 |

*Measured in an external magnetic field of 2,000 Oe.

Tape Samples A to E are typical examples of tapes produced using mildly oxidized magnetic Fe oxide. Any degree of the oxidation can be obtained by controlling the oxidizing temperature, time and atmosphere. The relation between the magnetism reduction ratio and the oxidation degree as shown in the FIGURE can be obtained using any oxidizing process.

It will be apparent from the results in the above Table that the Co-containing magnetic Fe oxide according to this invention is magnetically stable to mechanical pressure and impact and suitable for producing ageing resistant magnetic recording members.

The Co-containing magnetic Fe oxide is also useful for magnetic recording tapes for image signals, voice signals and digital information, magnetic recording sheets and magnetic recording discs.

While the invention has been described in detail and with reference to specific embodiments thereof, it will be apparent to one skilled in the art that various changes and modifications can be made therein without departing from the spirit and scope thereof.

What is claimed is:

1. A process for producing a magnetic Fe oxide having a coercive force of at least about 300 Oe and and optionally an element selected from the group consisting of Mg, Cu, Cr, Mn, Ni, Zn, Mo, Sn, Sb, Te, Rh, Ba, La, Ce, W, Bi and mixtures thereof, the amount of the element plus the Co being from about 0.5 to 33 atomic %, in which the oxidation degree indicated by the following equation ranges from about 30% to 80%:

$$\text{Oxidation Degree} = \left(1 - \frac{300 - y}{100 - y} \cdot R\right) \times 100 \ (\%)$$

wherein y is the amount of Co, plus divalent metal if present, in atomic % contained in the magnetic Fe oxide, and R is the ratio of the divalent Fe ions to the total Fe ions, which comprises (i) dehydrating goethite containing Co and optionally said element and (ii) reducing the dehydrated goethite containing Co, and optionally said element at a temperature of about 300° to 400° C., to obtain magnetite containing Co, and optionally, said element, followed by (iii) cooling the magnetite product of step (ii) to room temperature under a flow of nitrogen gas, (iv) covering the product of step (iii) with water, (v) removing excess water from the wet magnetite so that the magnetite particles produced in covering step (iv) have a moisture content of about 50 to 200% by weight relative to dried magnetite particles and (vi) oxidizing the magnetite at a relatively low temperature of less than 100° C. to form a magnetic iron oxide having said oxidation degree 2. The process of claim 1, wherein said reducing is with hydrogen or town gas.

3. The process of claim 1, wherein said oxidizing is at a temperature of about 40° to less than 100° C.

4. The process of claim 1, wherein said oxidizing is for a period of about ten minutes to one week.

5. The process of claim 1, wherein said covering step (iv) is by spraying the Co containing magnetite with water or by dipping the Co containing magnetite into a water bath.

* * * * *